(12) United States Patent
Dekker et al.

(10) Patent No.: US 8,497,224 B2
(45) Date of Patent: Jul. 30, 2013

(54) PROCESS FOR PREPARING A CATALYST SUBSTRATE

(75) Inventors: Desmond Marinus Cornelis Dekker, Amsterdam (NL); Gerardus Petrus Lambertus Niesen, Amsterdam (NL); Daan Vlaar, Amsterdam (NL)

(73) Assignee: Shell Oil Company, Houston, TX (US)

( * ) Notice: Subject to any disclaimer, the term of this patent is extended or adjusted under 35 U.S.C. 154(b) by 111 days.

(21) Appl. No.: 12/969,119

(22) Filed: Dec. 15, 2010

(65) Prior Publication Data
US 2011/0152063 A1  Jun. 23, 2011

(30) Foreign Application Priority Data

Dec. 16, 2009 (EP) ..................................... 09179428

(51) Int. Cl.
| | |
|---|---|
| *B01J 29/00* | (2006.01) |
| *B01J 29/04* | (2006.01) |
| *B01J 21/00* | (2006.01) |
| *B01J 21/04* | (2006.01) |
| *B01J 23/00* | (2006.01) |
| *B01J 23/02* | (2006.01) |
| *B01J 25/00* | (2006.01) |
| *B01J 29/87* | (2006.01) |

(52) U.S. Cl.
USPC ............. 502/60; 502/100; 502/300; 502/439; 502/527.14; 502/527.2; 502/527.24

(58) Field of Classification Search
USPC ........... 502/60, 100, 300, 439, 527.14, 527.2, 502/527.24
See application file for complete search history.

(56) References Cited

U.S. PATENT DOCUMENTS

| | | | | |
|---|---|---|---|---|
| 3,231,520 | A | 1/1966 | Leak et al. ..................... | 252/463 |
| 3,769,240 | A | 10/1973 | Lew .............................. | 252/468 |
| 6,485,136 | B1 * | 11/2002 | Shimizu et al. ................. | 347/86 |
| 7,576,035 | B2 * | 8/2009 | Ohno et al. .................... | 502/439 |
| 7,776,786 | B2 * | 8/2010 | DiFrancesco et al. ........ | 502/439 |
| 8,163,669 | B2 * | 4/2012 | Hampden-Smith et al. .. | 502/439 |
| 8,173,099 | B2 * | 5/2012 | Yener ............................ | 423/625 |
| 2003/0149120 | A1 | 8/2003 | Wang et al. .................... | 518/715 |
| 2005/0272602 | A1 * | 12/2005 | Ninomiya ...................... | 502/439 |
| 2008/0254254 | A1 * | 10/2008 | Ohno et al. .................... | 428/116 |

FOREIGN PATENT DOCUMENTS

| | | |
|---|---|---|
| DE | 19712625 | 10/1998 |
| DE | 10212586 | 10/2003 |
| WO | WO0207872 | 1/2002 |
| WO | WO2007068732 | 6/2007 |

OTHER PUBLICATIONS

Andersen 0 et al: "Melt extracted fibres boost porous parts" Metal Powder Report, MPR Publishing Services, Shrewsbury, GB, vol. 54, No. 7-8, Jul. 1, 1999, pp. 30-34, XP004289572 ISSN: 0026-0657* p. 30 * * Section "Properties of components"; p. 32 * tables*.

* cited by examiner

*Primary Examiner* — Cam N. Nguyen

(57) ABSTRACT

The invention comprises a process for manufacturing a catalyst substrate which is a shaped porous structure, said process comprising the steps of providing non-woven fibers with an average length in the range of 4-50 mm, an average diameter in the range of 5-300 microns, and a length over diameter ratio in the range of 50 to 500 into a mould to form a fibrous aggregate with volume (V), and compressing the fibrous aggregate to form a porous structure. The compression is carried out in such a manner that the volume of the fibrous aggregate in compressed state ($V_{compressed}$) is at most 90% of the volume (V) of the fibrous aggregate before compression. The invention further relates to the catalyst substrate prepared and to a catalyst comprising the catalyst substrate.

9 Claims, No Drawings

PROCESS FOR PREPARING A CATALYST SUBSTRATE

This application claims the benefit of European Application No. 09179428.9 filed Dec. 16, 2009 which is incorporated herein by reference.

BACKGROUND OF THE INVENTION

This invention relates to a method for manufacturing a catalyst substrate, a catalyst substrate as prepared according to the invention, and a catalyst based on said substrate. The substrate is suitable for manufacturing catalysts for a number of different reactions including Fischer-Tropsch reaction.

Many catalytic reactions are mass transfer-limited. For these reactions it is important that the reaction components have easy access to the catalytic sites, and that the reaction products can easily be removed from the catalytic sites. For these types of reactions catalyst accessibility is of prime importance.

For example for Fisher-Tropsch reactions, catalysts have been used based on porous substates. WO2006/037776 describes the use of woven or non-woven metal structures in the shape of blankets, and porous catalyst elements based on gauze, sponge, foam, foil constructs, mesh, or webbing material.

It has been found that the wire structures used as catalyst substrate known in the art often have insufficient strength. Further, they are difficult to obtain in different shapes, and depending on the nature of the material, they may be quite costly. For example, a substrate based on drawn wires is quite expensive due to the high cost of the starting material.

There is therefore a need for a process for manufacturing a catalyst substrate which allows the use of relatively inexpensive starting materials, which allows manufacturing substrates in different shapes, and which provides catalyst substrates with good strength and porosity characteristics. There is also need for a catalyst substrate which combines high strength with good porosity characteristics, ease of manufacture, and availability of different shapes.

SUMMARY OF THE INVENTION

According one aspect of the present invention, there is provided a process for manufacturing a catalyst substrate which is a shaped porous structure, said process comprising the steps of providing non-woven fibers with an average length in the range of 4-50 mm, an average diameter in the range of 5-300 microns, and a length over diameter ratio in the range of 50 to 500 into a mould to form a fibrous aggregate with volume (V), and compressing the fibrous aggregate to form a porous structure, the compression being carried out in such a manner that the volume of the fibrous aggregate in compressed state ($V_{compressed}$) is at most 90% of the volume (V) of the fibrous aggregate before compression.

In the context of the present specification a fibrous aggregate refers to an aggregate of loose fibers which have not been purposefully made to adhere to each other. Before compression, the volume taken by the fibrous aggregate is volume V. Volume V is the volume of the fibrous aggregate in the mould after the non-woven fibers have been provided to the mould, and before compression. After compression, the volume of the fibrous aggregate is $V_{compressed}$.

According to another aspect of the present invention there is provided a catalyst substrate which is a shaped porous structure comprising non-woven fibers with an average length in the range of 4-50 mm, an average diameter in the range of 5-300 microns, and a length over diameter ratio in the range of 50 to 500, which has been prepared using the process of the present invention.

DETAILED DESCRIPTION OF THE INVENTION

The present invention and its advantages will be described in more detail below, as will be further aspects of the invention.

As compared to the gauze structures known in the art, the substrate of the present invention is characterised by a number of features. In the first place, the fibers are non-woven. Further, the fibers have a limited length, a specific diameter, and specific aspect ratio.

The fibers present in the substrate have an average length in the range of 4-50 mm. If the average length of the fibers is below 4 mm, the strength of the substrate will be detrimentally affected. If the average length of the fibers is above 50 mm, it will become more difficult to prepare a system with an appropriate structure. In one embodiment, the fibers have an average length of at least 8 mm, more in particular at least 10 mm. In one embodiment, the fibers have an average length of at most 40 mm, more in particular at most 30 mm.

The fiber length is the shortest distance between the two terminal ends of the fiber (as opposed to the length of the fiber from one end to the other along the length of the fiber body). The fiber length can be determined visually, where necessary with a microscope or other magnifying apparatus, or using measuring apparatus known in the art, such as a slide caliper. The average fiber length is calculated from the length of a random sample of 100 fibers.

As the presence of small fibers may detrimentally affect the properties of the substrate, it may be preferred for less than 10%, determined by number, of the fibers in the substrate to have a length below 4 mm. More in particular it may be preferred for less than 5%, determined by number, of the fibers in the substrate to have a length below 4 mm, or even less than 2%.

In one embodiment, the difference in length between the fibers is relatively small. This is because this will ensure a more homogeneous structure. Therefore, in one embodiment it is preferred for at least 50% by number of the fibers to have a length within 20% of the average fiber length. More in particular, it may be preferred for at least 70% by number of the fibers to have a length within 20% of the average fiber length, or at least 80%, or even at least 90%.

The fibers have an average diameter in the range of 5-300 microns. If the average diameter is too low, the strength of the structure will be detrimentally affected. On the other hand, above a certain value increase of the diameter will not contribute to the properties of the shaped porous structure, but will continue to the weight and the costs. The average diameter is calculated from the average length, determined as described above, and the density of the material from which the fibers are prepared, assuming that the fibers have a cylindrical shape.

In one embodiment, the average diameter of the fibers is at least 20 microns, more in particular at least 25 microns, still more in particular at least 50 microns. In one embodiment, the average diameter of the fibers is at most 250 microns, more in particular at most 150 microns.

The fibers have a length over diameter ratio in the range of 50-500. This value, which will also be indicated as the aspect ratio, is defined as the average length, as defined above, divided by the average diameter, as defined above. If the aspect ratio is too low, the strength of the substrate will be insufficient. If the aspect ratio is too high, the strength of the substrate will also be insufficient. In one embodiment, the fibers have an aspect ratio of at least 75, more in particular at least 100. In one embodiment, the fibers have an aspect ratio of at most 350, more in particular at most 300.

The catalyst substrate of the present invention can have a very high void fraction. In one embodiment, the void fraction is at least 80%, more in particular at least 85%, still more in particular at least 90%. In one embodiment, the catalyst substrate of the present invention has a void fraction in the range of 92-97%. An upper limit for the void fraction of 99% may be mentioned. The void fraction is determined from the density of the catalyst substrate as compared to the density of the material from which the substrate fibers are prepared using the following formula:

void fraction=[1−(substr. density/mater. density)]*100%

The use of fibers with the specified properties makes for catalyst substrates which can have a very large geometric surface area. This makes the catalyst substrates very suitable for use in catalytic processes where the reaction rate is limited by mass transfer, such as Fischer-Tropsch, hydrocracking, denox, flameless combustion, and alkylation. In one embodiment, the geometric surface area of catalyst substrates according to the invention is at least 500 $m^2/m^3$, more in particular at least 1000 $m^2/m^3$. The upper limit of the geometric surface area is not critical to the present invention. Values up to 8000 $m^2/m^3$ and more may be obtained.

In one embodiment of the present invention, the catalyst substrate has a structure in which the fiber density of the outer layer is higher than the fiber density of the core. It has been found that a catalyst substrate with this structure combines a high void fraction with high strength and in particular high attrition resistance. The outer layer is the layer which, on the basis of the cross-section of the substrate, makes up the outer 25% of the substrate. In this embodiment, the fiber density of the outer layer is at least 10% higher than the fiber density of the core.

The shaped porous structure generally has a size of at least 0.5 $cm^3$. The maximum size of the shaped porous structure is not critical, and will depend on the application of the catalyst, and on considerations like ease of handling, size and shape of the unit, etc. As a maximum value a size of 5 $m^3$ may be mentioned.

In one embodiment, the catalyst substrate has a volume in the range of 0.5-200 $cm^3$. Catalyst substrates within this volume range may for example be used for manufacturing fixed bed or moving bed catalyst particles. In another embodiment, the catalyst substrate has a volume in the range of 200 $cm^3$ to 5 $m^3$. For shaped reactor filling substrates, a volume range of 0.05-5 $m^3$ may be mentioned.

The nature of the fibers used in the present invention may depend on the nature of the catalyst to be based on the substrate. Obviously, the fibers should be such that the substrate will not disintegrate under the conditions in which the catalyst will be used. Examples of suitable materials include rock wool, glass fibers, and fibers of metal or metal alloy. Fibers of metal or metal alloy may be preferred. In one embodiment, the fibers will comprise stainless steel, such as stainless steel AISI 310, AISI 316, or AISI 430. In other embodiments, the fibers are, for example, of iron, copper, nickel, molybdenum, and/or aluminium. In one embodiment, the nature of the fibers is selected to contribute to the catalytic activity of the final catalyst. This will be elucidated in more detail below.

In one embodiment, the fibers have a relatively rough surface structure, e.g., on the microscopic scale. This makes for improved adhesion of the catalytic component to the fibers. The surface roughness, expressed in percent, is the measured circumference of the fiber divided by the calculated circumference of the fiber, wherein the calculated circumference is n*the average diameter of the fibers.

The circumference of the fiber may be determined, for example, using an optical method. The fibers are embedded in a resin and coupes are prepared therefrom over the cross-section of the fibers. The circumference of the fiber may then be determined using conventional microscopical methods, e.g., line measurement by hand or via appropriate software. To increase the accuracy of the method it is recommended to measure the circumference of a number of fiber cross-sections, e.g., 10, 20, or 50, and to calculate the average measured circumference therefrom.

In one embodiment of the present invention, the surface roughness is at least 105%. It may be preferred for the surface roughness to be at least 110%. In some embodiments, the surface roughness may be at least 115%, or even at least 120%. While the upper limit of the surface roughness is not critical to this embodiment of the present invention, a value of at most 200% may be mentioned as a general value.

In one embodiment, the fibers are rapidly solidified metal fibers. It has been found that these fibers combine a suitable surface roughness with suitable length, diameter, and aspect ratio requirements.

Rapidly solidified metal fibers are known in the art. They are produced for example via a process in which a rotating wheel is brought into contact with liquid metal, for example by plunging it into a pool of molten metal or contacting it with the molten tip of a metal rod. The wheel is wetted by the liquid metal. The fibers separate from the wheel through centrifugal forces. Methods for manufacturing metal fibers through rapid solidification processes are known in the art. They are for example described in U.S. Pat. No. 5,027,886, DE19711764, and DE10000097. The rapid solidification process can take place in an inert gas environment or in a non-inert environment, e.g., in air. Suitable rapidly solidified metal fibers can be obtained commercially from, int. al., Fraunhofer and Fibretech.

The present invention pertains to a process for manufacturing a catalyst substrate which comprises the steps of providing fibers into a mould to form a fibrous aggregate with volume (V), and compressing the fibrous aggregate to form a porous structure, the compression being carried out in such a manner that the volume ($V_{compressed}$) of the fibrous aggregate in compressed state is at most 90% of the volume (V) of the fibrous aggregate before compression. The fibres are non-woven fibers with an average length in the range of 4-50 mm, an average diameter in the range of 5-300 microns, and a length over diameter ratio in the range of 50 to 500.

The first step in the process according to the invention is providing the fibers into a mould to form a fibrous aggregate. In the context of the present specification a fibrous aggregate refers to an aggregate of loose fibers which have not been purposefully made to adhere to each other. Before compression, the volume taken by the fibrous aggregate is volume V. Volume V is the volume of the fibrous aggregate in the mould after the non-woven fibers have been provided to the mould, and before compression. After compression, the volume of the fibrous aggregate is $V_{compressed}$.

In providing the fibers to the mould to form a fibrous aggregate, care should be taken of the following. In the first place, the fibers should not adhere to each other, or only to a limited extent. Otherwise, it will be difficult to effect proper process control. For example, dosing will be difficult, which may result in inadequate density control. Further, when aggregated fibers are provided to the mould, this may result in the formation of an inhomogeneous structure.

If necessary, the fibers may thus be subjected to a deaggregation step before they are brought into the mould. A deaggregation step may encompass, for example, deaggregating the fibers using steel brushes, or providing the fibres to the mould through a vibrating sieve. Other suitable methods will be evident to the skilled person.

Care should also be taken to ensure that the fibers in the mould are not oriented overmuch in the same direction, as this may result in a catalyst substrate with a too high density and insufficient strength.

That the fibers are not overmuch oriented in the mould can be ensured by a number of measures. In the first place, the fiber length should be selected appropriately as the presence of too long fibers will favour orientation occurring. Further, the length which the fibers have to travel when they are provided to the mould should not be too long, as a too high dropping length will favour orientation occurring. Further the density of the dropping fibers should be not too high, as a too high density will favour orientation of the fibers in the fibrous aggregate.

With the above guidelines the skilled person will be able to select a method for providing the fibers into a mould to form a fibrous aggregate.

The next step in the process according to the invention is compressing the fibrous aggregate to form a porous structure, wherein the compression of the fibers is carried out in such a manner that the volume of the fibrous aggregate in compressed state is at most 90% of the volume of the fibrous aggregate before compression. More in particular, the volume of the fibrous aggregate in compressed state is at most 70% of the volume of the fibrous aggregate before compression, still more in particular at most 50%, even more in particular at most 30%. In general, the volume of the fibrous aggregate in compressed state is at least 5% of the volume of the fibrous aggregate before compression, more in particular at least 10%, still more in particular at least 15%.

Compression of the fibrous aggregate can be carried out by applying pressure onto the aggregate from one or more sides. It will be evident to the skilled person how this can be effected.

Generally, at least part of the compression step takes place when the fibrous aggregate is still in the mould. It is possible to carry out part of the compression step on the aggregate while it is in a mould, and carrying out a further part of the compression step when the partially compressed aggregate has been removed from the mould. For example, the first part of the compression step may be used to form rough spheres which are compressed further by bringing them into a vibrating container, where they are compressed by being bounced off the walls of the container.

The degree of compression influences the final properties of the catalyst substrate as follows. The higher the degree of compression, the more the compressed fibers will entangle. This will have a positive influence on the strength of the catalyst substrate. On the other hand, if the degree of compression becomes very high, this may detrimentally affect the porosity of the structure. Thus, the degree of compression will have to be selected in balance with the properties of the fibers. It is within the scope of the skilled person to select an appropriate degree of compression.

An advantage of the process according to the invention is that the size and shape of the mould can be selected to obtain a shaped porous structure which is tailored to a specific use.

For example, the size and shape of the mould can be selected so that a catalyst substrate is formed which has a shape fitted to the unit in which it will be used. For example, it may be tailored to encompass spaces for heating or cooling pipes, or it may be tailored to take into account curvature of the reactor.

The size and shape of the mould may also be selected to form catalyst substrates in the shape of mats or mattresses, spheres, cylinders, cubes, blocks, pyramids, donuts, or irregular shapes, for example for use in fixed bed or moving bed applications. The use of spheres may sometimes be preferred as these show high attrition resistance. The use of cylinders may sometimes be preferred for reasons of processing efficiency.

The catalyst substrate as it is removed from the mould may have the final shape for the catalyst as it will be used. It is also possible, however, for the substrate as it is removed from the mould to be subjected to a further shaping step.

For example, in one embodiment, the mould is an endless belt which is provided with the fibers to form a fibrous aggregate. The fibrous aggregate is then compressed, e.g. in a double belt press, and if necessary the resulting compressed sheet is cut into the desired shapes. Cutting is not always necessary, however. For example, it is possible to manufacture individual mats by stopping and then restarting the provision of fibers onto the endless belt.

The catalyst substrate according to the invention can be converted to a catalyst by combining it with a catalytically active material, and optionally with an oxidic carrier material. The nature of the catalytically active material will depend on the reaction in which the catalyst is to be used. Whether or not an oxidic carrier material will be used will also depend on the nature of the reaction in which the catalyst is to be used.

Suitable catalytically active material may encompass catalytically active metal components, or other catalytically active components such as molecular sieves, including zeolites.

Suitable catalytically active metals include the noble and non-noble metals of Group VIII of the periodic table of elements (CAS Version), more in particular iron, cobalt, nickel, platinum and palladium, metals of Group VIB of the periodic table of elements, more in particular chromium, molybdenum, and tungsten, metals of Group VIIB of the periodic table of elements, more in particular manganese.

Suitable oxidic carrier materials include alumina, silica, titania, zirconia, gallia, ceria and mixtures and combinations thereof. Preferably the oxidic carrier material comprises, or even consists of, titania.

The catalytically active material or a precursor therefor and where applicable the oxidic carrier material or a precursor therefor may be applied to the catalyst substrate in manners known in the art. For example, they may be applied in the form of a solution or dispersion in a liquid medium, e.g., in an aqueous medium, followed by removal of the liquid medium.

In case an oxidic carrier material or a precursor therefor is applied to the catalyst structure prepared according to the present invention, a coated fibrous aggregate is formed. In the context of the present specification the word coated should not be interpreted as requiring that the entire surface of all fibers is provided with oxide or precursor. The oxidic carrier material and/or the precursor of an oxidic carrier material is preferably subjected to a drying step. More preferably the oxidic carrier material and/or the precursor of an oxidic carrier material is subjected to a calcination step.

An oxidic carrier material on the catalyst structure prepared according to the present invention ensured additional cohesion between the fibres. Especially after drying and/or calcining of an oxidic carrier material or a precursor therefor on the catalyst structure, the cohesion between the fibres is improved. Suitable calcination conditions include a temperature of 200-900° C., in particular 450-900° C. in air for a period of 0.5-10 hours.

In one embodiment the catalyst substrate is provided with an aqueous solution or dispersion comprising one or more precursors of the oxidic carrier material, e.g., a solution or dispersion comprising one or more salts or (hydr)oxides of silicon, zirconium, gallium, cesium, titanium, or aluminium, e.g., aluminium trihydrate, aluminium monohydrate, silicilic acid, titanium lactate, and an ammonium salt of lactic acid titanate chelate, such as Tyzor® obtainable from DuPont.

The use of the combination of a first type of oxidic carrier in combination with a precursor for a second type of oxidic carrier is also envisaged. For example, a dispersion may be used comprising a particulate oxidic carrier material, e.g., alumina, silica, titania, or silica-alumina, in combination with a carrier precursor which acts as adhesive for the particulate carrier. Examples of suitable precursors in this respect include acid-peptised aluminium trihydrate, silicic acid, and compounds like titanium lactate, and an ammonium salt of lactic acid titanate chelate, such as Tyzor® obtainable from DuPont.

After application of the solution or dispersion, the aqueous medium is removed, and the coated catalyst substrate is subjected to a calcination step to convert the precursors into their oxides. Suitable calcination conditions include a temperature of 200-900° C., in particular 450-900° C. in air for a period of 0.5-10 hours.

In one embodiment an adhesive is added to the catalyst substrate and in a next step the oxidic carrier material or the catalytically active component is applied to the catalyst substrate. Suitable adhesives include acid-peptised aluminium trihydrate, silicic acid, and ammonium salt of lactic acid titanate chelate, such as Tyzor® obtainable from DuPont.

To facilitate adhesion of the catalytically active compound or the oxidic carrier material, the catalyst substrate can be cleaned and roughened before application of the refractory oxide, especially when the catalyst substrate comprises metal. As it may be difficult to clean the fibers in the final catalyst substrate, it may be preferred to ensure that the fibers have the appropriate properties before they are incorporated into the catalyst substrate.

The oxide or the precursor therefor may be applied to the porous substrate by means conventional in the art, e.g., spray coating, wash coating, dip coating, or plasma coating. The refractory metal oxide may be provided when the substrate has been removed from the mould, but also when the substrate is still in the mould.

A catalytically active material will be applied onto the catalyst substrate. As indicated above, suitable catalytically active material may encompass catalytically active metal components, or other catalytically active components such as molecular sieves, including zeolites. Suitable catalytically active metal components include (components of) the noble and non-noble metals of Group VIII of the periodic table of elements (CAS Version), more in particular iron, cobalt, nickel, platinum and palladium, metals or Group VIB of the periodic table of elements, more in particular chromium, molybdenum, and tungsten, metals of Group VIIB of the periodic table of elements, more in particular manganese.

Catalytically active components such as molecular sieves may be applied to the carrier in the same way as described above for the oxidic material. In a preferred embodiment a dispersion is used comprising a combination of a particulate molecular sieve and a precursor of an oxidic carrier. For example, a dispersion may be used comprising a particulate molecular sieve in combination with a carrier precursor which acts as adhesive for the particulate carrier. Examples of suitable precursors in this respect include acid-peptised aluminium trihydrate, silicic acid, and compounds like titanium lactate, and an ammonium salt of lactic acid titanate chelate, such as Tyzor® obtainable from DuPont.

The molecular sieves suitable for use in this invention encompass the molecular sieves known in the art of catalysis. Suitable molecular sieves include ZSM-5 and other ZSM-type sieves, and zeolites like zeolite beta, zeoliet X, and zeolite Y. Combinations of various types of materials may also be used.

After application of the solution or dispersion, the aqueous medium is removed, and the coated catalyst substrate is subjected to a calcination step to convert the precursors into their oxides, under the conditions stipulated above.

As indicated above, the nature of the catalytically active metal will depend on the nature of the reaction to be catalysed. The catalytically active metal component will generally be applied onto the substrate by contacting the substrate with an aqueous solution or dispersion of a salt of an active metal component precursor, followed by removal of the aqueous medium. The catalyst substrate provided with the aqueous medium may then be subjected to a calcination step and optionally a reduction step. In a calcination step, performed, for example at a temperature of 300-700° C., the metal salt is converted to the metal oxide. After a reduction step, the metal component is converted to its metallic form.

The various components can be applied to the substrate simultaneously, for example by combining catalytically active components or precursors with the oxide or precursors therefor when they are applied onto the catalyst substrate.

However, especially where a catalytically active metal component is used, it is sometimes preferred for reasons of process control, to first provide the substrate with an oxidic material, and then provide the coated substrate with the catalytically active metal component or precursor therefor, for example via impregnation.

The catalyst substrate described herein is especially suitable as a substrate for a catalyst used in diffusion-limited reactions most especially the Fischer-Tropsch reaction, but also hydrocracking, oxidative desulphurisation, denox, flameless combustion, alkylation, and hydrotreating, including hydrogenation, hydrodesulphurisation, hydrodentitrogenation, hydrodemetallistaion, and hydrodearomatisation.

Catalysts used in the Fischer-Tropsch synthesis often comprise a substrate material and one or more metals from Group VIII of the Periodic Table, especially from the cobalt and iron groups, optionally in combination with one or more metal oxides and/or metals as promoters selected from zirconium, titanium, chromium, vanadium and manganese, especially manganese. A Fischer-Tropsch catalytically active metal or precursor preferably includes a metal such as cobalt, iron, nickel and ruthenium, more preferably cobalt. The catalytically active metal may be present in the catalyst together with one or more metal promoters or co-catalysts. The promoters may be present as metals or as the metal oxide, depending upon the particular promoter concerned. Suitable promoters include oxides of metals from Groups IA, IB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, maganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium. A most suitable catalyst comprises cobalt as the catalytically active metal and zirconium as a promoter. Another most suitable catalyst comprises cobalt as the catalytically active metal and manganese and/or vanadium as a promoter.

Catalysts suitable for use in hydrocracking often comprise as catalytically active metal or precursor one or more metals selected from Groups VIB and VIII of the Periodic Table of Elements. Preferably, the hydrocracking catalysts contain one or more noble metals from Group VIII. Preferred noble metals are platinum, palladium, rhodium, ruthenium, iridium and osmium. Most preferred catalysts for use in the hydrocracking stage are those comprising platinum. In a hydrocracking catalyst, it may be preferred to provide the catalyst substrate with alumina, silica, silica-alumina, or titania as oxidic material. For a hydrocracking catalyst it may be preferred to combine a catalytically active metal as described above with a molecular sieve, for example a zeolite, for a particular example a Y zeolite.

For alkylation the catalyst may, for example contain as catalytically active component a molecular sieve, for example one or more of zeolite Y, zeolite beta, or ZSM-5, optionally in combination with an active metal component.

For hydrotreating of hydrocarbon feeds, encompassing one or more of hydrogenation, hydrodesulphurisation, hydrodenitrogenation, hydrodemetallisation, or hydrodearomatisation, a suitable catalyst may encompass an oxidic carrier, for example comprising silica, alumina, titania, or combinations thereof, in particular alumina, in combination with an active metal component comprising a combination of a Group VIB metal component, in particular molybdenum and/or tungsten, more in particular molybdenum, with a Group VIII non-noble metal component, in particular cobalt and/or nickel.

For denox a suitable catalyst may comprise vanadium a catalytically active component and titania as oxidic carrier.

In one embodiment, the material of the fibers acts as catalytically active component. For example, for flameless combustion a catalyst may be prepared comprising titania as oxidic component on a substrate comprising copper fibers. In this case the copper fibers act as catalytically active component.

The amount of the various components incorporated onto the catalyst substrate may vary within broad ranges. In general, the catalytically active component and, where present, the oxidic carrier material make up at least 0.5 vol. % of the catalyst. As an upper level, a value of at most 40 vol. % may be mentioned. More in particular, the catalytically active component and, where present, the oxidic carrier material make up between 1 and 20 vol. % of the catalyst, still more in particular between 5 and 15 vol. %. The volume of the catalyst is the outer volume of the shaped porous catalyst particle.

In one embodiment, the catalyst particle may comprise 0.5-40 vol. % of catalytically active component and carrier, in particular between 1 and 20 wt. %, still more in particular between 5 and 15 wt. %, and 1-20 vol. % of fibers, in particular 1-10 vol. %, more in particular 3-8 vol. %.

The present invention also pertains to the use of a catalyst comprising a catalyst substrate described above in catalysing a diffusion limited reaction. The diffusion-limited reaction may for example be selected from the Fischer-Tropsch reaction, hydrocracking, oxidative desulphurisation, denox, flameless combustion, and alkylation. It is considered particularly suitable for catalysing Fischer-Tropsch reactions.

The invention also pertains to a process for performing a diffusion limited reaction wherein a feedstock is contacted under reaction conditions with a catalyst comprising a catalyst substrate as described above.

In one embodiment, the invention also provides a process for the production of liquid hydrocarbons which comprises providing a feed comprising CO and H2 to a reactor comprising a Fischer-Tropsch catalyst, the reactor being at reaction temperature and pressure, and withdrawing an effluent from the reactor, the catalyst comprising one or more metals from Group VIII of the Periodic Table metal of Elements, and a refractory oxide on a catalyst substrate, the substrate being a substrate as described above.

The reactor used in the Fischer-Tropsch process according to the invention may be an immobilised slurry reactor, an ebullating bed reactor or a multitubular fixed bed reactor, preferably an immobilised slurry reactor.

The Fischer-Tropsch reaction is preferably carried out at a temperature in the range from 125 to 400° C., more preferably 175 to 300° C., most preferably 200 to 260° C. The gaseous hourly space velocity may vary within wide ranges and is typically in the range from 500 to 10000 Nl/l/h, preferably in the range from 1500 to 4000 Nl/l/h. The hydrogen to CO ratio of the feed as it is fed to the catalyst bed generally is in the range of 0.5:1 to 2:1.

In one embodiment the feed is provided to the reactor in the form of a mixture of hydrogen and CO, for example in the form of a syngas feed. In another embodiment, the hydrogen and CO are provided to the reactor in different streams.

Products of the Fischer-Tropsch synthesis may range from methane to heavy hydrocarbons. Preferably, the production of methane is minimised and a substantial portion of the hydrocarbons produced have a carbon chain length of a least 5 carbon atoms. Preferably, the amount of C5+ hydrocarbons is at least 60% by weight of the total product, more preferably, at least 70% by weight, even more preferably, at least 80% by weight, most preferably at least 85% by weight. The CO conversion of the overall process is preferably at least 50%.

The products obtained via the process according to the invention can be processed through hydrocarbon conversion and separation processes known in the art to obtain specific hydrocarbon fractions. Suitable processes are for instance hydrocracking, hydroisomerisation, hydrogenation and catalytic dewaxing. Specific hydrocarbon fractions are for instance LPG, naphtha, detergent feedstock, solvents, drilling fluids, kerosene, gasoil, base oil and waxes.

In one embodiment it may be preferred to treat the catalyst of the present invention with a wax before providing it to the Fischer-Tropsch reactor. Treating the particles with a wax may serve to facilitate handling, transport, and installation of the particles by improving the strength of the particles. The wax may be incorporated into the catalyst substrate by combining the substrate with liquified wax, e.g., through dipping or impregnation, optionally removing excess wax, and allowing the wax remaining on the particles to solidify. Suitable waxes include those which are substantially non-tacky below a temperature of about 40° C. For more information on this embodiment, reference is made to what is stated in EP 2 000 207.

The present invention also pertains to a catalytic hydrocracking reaction in which a hydrocarbon feed is contacted under hydrocracking reaction conditions with a catalyst comprising a Group VIII metal component on a catalyst substrate, the substrate being a catalyst substrate as described above. Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The present invention will be elucidated by the following examples, without being limited thereto or thereby.

EXAMPLE 1

Substrate Preparation

Stainless steel AISI310 fibers were subjected to a heat treatment at 600° C. in air for 5 hours to increase the surface roughness of the fibers. The fibers had an average length of 25 mm, an average diameter of 121 microns, and a surface roughness of 140%.

The fibers were brought into a cylindrical mould with a pin along the axis. The mould had an inner diameter of 90 mm. The central pin had a diameter of 33 mm. The mould was provided with 132 grams of fibers, to form a fibrous aggregate with a height of 35 cm. The initial stacking density was 68 gram/liter.

The stack was compressed by providing a circular disc with a diameter of 90 mm and a hole in the middle with a diameter somewhat larger than the diameter of the pin, and pressing the disc into the mould. The volume before compression was 4.73 times as large as the volume after compression. The volume of the fibrous aggregate in compressed state was 21.1% of the volume of the fibrous aggregate before compression.

The resulting catalyst substrate was donut-shaped, with a height of 74 mm and a diameter of 90 mm, the diameter of the hole in the middle being 33 mm. The density of the substrate was 324 grams/liter. The volume was 407 ml. The volume is the volume of the shaped object, excluding the hole in the middle. The void fraction was 95.8 vol. %.

EXAMPLE 2

Catalyst Preparation

The substrate prepared in example 1 above was contacted with an aqueous slurry in a vacuum coating process.

The composition of the slurry used was:
- 208.3 grams of titania particles as catalyst carrier
- 101.6 grams, calculated as metal, of a water-soluble cobalt salt
- 70.3 grams of binder (an ammonium salt of lactic acid titanate chelate, Tyzor® obtained from DuPont)
- 587.5 grams of water The coated substrate was dried at 120° C. and calcined in a muffle furnace at 535° C. The overall weight of the coated structure was 213.4 grams. The total of carrier, metal, and binder on the final catalyst was 10 vol. %.

What is claimed is:

1. A process for manufacturing a catalyst substrate, said process comprising the steps of feeding non-woven fibers with an average length in the range of 4-50 mm, an average diameter in the range of 5-300 microns, and a length over diameter ratio in the range of 50 to 500 into a mould to form a fibrous aggregate with volume (V), and compressing the fibrous aggregate to form a porous structure the compression being carried out in such a manner that the volume of the fibrous aggregate in compressed state ($V_{compressed}$) is at most 90% of the volume (V) of the fibrous aggregate before compression.

2. A process according to claim 1, wherein the volume of the fibrous aggregate in compressed state ($V_{compressed}$) is at most 70% of the volume (V) of the fibrous aggregate before compression, the volume ($V_{compressed}$) being at least 5% of the volume (V) of the fibrous aggregate before compression.

3. A process according to claim 1 wherein the fibers have an average length of at least 8 mm, the average length being at most 40 mm.

4. A process according to claim 1 wherein at least 50% by number of the fibers have a length within 20% of the average fiber length.

5. A process according to claim 1 wherein the average diameter of the fibers is at least 20 microns, the average diameter of the fibers being at most 250 microns.

6. A process according to claim 1 wherein the fibers have a length over diameter ratio of at least 75, the length over diameter ratio being at most 350.

7. A process according to claim 1 wherein the compression is carried out in such a manner that the catalyst structure formed has a void fraction of least 80%.

8. A process according to claim 1 wherein the compression is carried out in such a manner that the catalyst structure formed has a geometric surface area of catalyst substrates of at least 500 $m^2/m^3$.

9. A process according to claim 1 wherein the fibers are rapidly solidified metal fibers.

* * * * *